United States Patent [19]

Nagayama et al.

[11] 3,714,238
[45] Jan. 30, 1973

[54] METHOD OF SULFONATING AN OLEFIN MIXTURE

[75] Inventors: Masuzo Nagayama, Nerima-ku; Hiroshi Okada, both of Tokyo, Japan

[73] Assignee: Lion Fat & Oil Co., Ltd., Tokyo, Japan

[22] Filed: Dec. 4, 1969

[21] Appl. No.: 882,339

[30] Foreign Application Priority Data

Dec. 11, 1968 Japan ..................43/90239

[52] U.S. Cl. ............................260/513 R
[51] Int. Cl. ............................C07c 143/02 C0 7c 143/10, CO 7c 143/16
[58] Field of Search ..................260/513 R

[56] References Cited

UNITED STATES PATENTS 3,544,475  12/1970  Tomiyama et al. ...............260/513 R
3,492,239  1/1970  Baumann et al. ..................260/513 R Primary Examiner—Daniel D. Horwitz
Attorney—Woodhams, Blanchard and Flynn

[57] ABSTRACT

The present invention relates to a method of sulfonating an olefin mixture, in which an olefin mainly consisting of α-olefin having 10–20 carbon atoms is admixed with an olefin mainly consisting of an olefin of vinylidene type having 10–20 carbon atoms in such a way as to make the ratio of said α-olefin to said vinylidene type olefin in the aforementioned olefin mixture range between 95:5 and 70:30 by weight, by the use of an inert gas mixture of $SO_3$. It is possible by this method to keep the formation of disulfonates extremely low during the sulfonating process and the olefin sulfonates thus obtained have excellent biodegradability, detergency and foaming effect and, when granulated, a very good preservability and are particularly suited for material for a detergent.

6 Claims, No Drawings

METHOD OF SULFONATING AN OLEFIN MIXTURE

BACKGROUND OF THE INVENTION

1. Field of the invention

The present invention relates to a method of sulfonating olefin having 10–20 carbon atoms. In sulfonating α-olefin having 10–20 carbon atoms by the use of an $SO_3$ gas, the quantity of disulfonates formed during the sulfonating process can be limited to a very small amount by introducing an olefin of vinylidene type having 10–20 carbon atoms into the α-olefin in such a way as to obtain a resultant ratio of α-olefin to vinylidene type olefin in the mixed olefin in the range of from 95:5 to 70:30 by weight and then sulfonating the mixed olefin with an inert gas mixture of $SO_3$. The olefin, sulfonate thus obtained is favorably suited for a detergent material.

2. Description of the prior art

α-olefin sulfonates which have 10–20 carbon atoms are now widely used in the manufacture of household detergents because of their excellent detergency, foaming effect and biodegradability. These α-olefin sulfonates are in general prepared by sulfonating α-olefins, which are obtained chiefly by means of ethylene polymerization or wax-cracking, with use of an inert gas mixture of $SO_3$. The sulfonated products thus obtained are then hydrolyzed after having been neutralized or neutralized after having been hydrolyzed and they mainly consist of the under-mentioned three components: (A), (B), and (C):

component (A) alkene monosulfonate
component (B) hydroxy alkane monosulfonate
component (C) alkene disulfonate and hydroxyalkane disulfonate The content of the respective components (A), (B), and (C) in α-olefin sulfonates can be changed considerably by controlling the sulfonating conditions, hydrolyzing conditions, etc.; however, (A) ranges approximately between 40 and 70 percent, (B) approximately between 30 and 40 percent and (C) approximately between 10 and 20 percent. The component (C), that is such disulfonates as alkene disulfonate and hydroxy alkane disulfonate are considerably inferior to monosulfonate in their detergency, foaming and other properties as shown in Table 1

TABLE 1

Comparison of properties of olefin disulfonate and monosulfonate

| | | Disulfonate C15–18 | Monosulfonate C15–18 |
|---|---|---|---|
| Surface tension | 0.1%* (dyne/cm) | 67.2 | 34.9 |
| Penetrativity | 0.1%* (sec) | 28.6 | 22.4 |
| Foaming effect (mm) | 0.1%* | 68 | 186 |
| Relative detergency** 3°DH 25°C. | 0.15(%) 0.10 0.05 0.03 | 74 69 53 41 | 92 81 66 46 |

\* JISK-3362 (1955)
\*\* Relative estimates based on natural soil.

It has also been evidenced that, when incorporated in powder detergents, the disulfonate degrades the stability of the detergents by increasing their hygroscopic properties. Accordingly, it has been desired to keep the content of disulfonate contained in olefin sulfonates approximately to 8 percent or less or, more preferably, approximately to 5 percent or less, to reduce the undesirable nature of hygroscopic property and tackiness and to improve the desirable properties of foaming, detergency, etc. of the detergents. However, it has been extremely difficult to reduce the quantity of disulfonate contained in olefin sulfonates simply by modifying the sulfonating conditions.

For instance, the formation of disulfonate can actually be reduced to some extent by lowering the concentration of $SO_3$, which, however, raises a problem that the reaction rate of olefin sulfonation is remarkably reduced.

SUMMARY OF THE INVENTION

It is an object of the invention to provide a process for the production of olefin sulfonates according to which the amount of disulfonate contained in olefin sulfonates is minimized.

Another object of the present invention is to provide a method which is not only able to keep the formation of disulfonate very small, but also to obtain olefin sulfonates at a very high rate of sulfonation even by the use of reduced amount of $SO_3$ in the process.

One further object of the invention is to provide a method of preparing olefin sulfonates which are suited to the manufacture of detergents having excellent biodegradability, foaming effect and detergency.

Still another object of the invention is to provide a method of manufacturing olefin sulfonates particularly fitted for making granular detergents which have an excellent preservability.

DESCRIPTION OF THE PREFERRED EMBODIMENTS

The inventors have achieved this invention by making a discovery that it is possible to control the formation of disulfonate by introducing olefin of the vinylidene type, which may be expressed by the general formula of

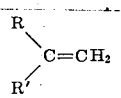

(where R and R' stand for alkyl radicals), into α-olefin.

More particularly, according to the invention, an olefin mixture, which is prepared by admixing an olefin which mainly consists of α-olefin having 10–20 carbon atoms with an olefin which mainly consists of an olefin of the vinylidene type having 10–20 carbon atoms in such a way as to make a ratio of α-olefin to vinylidene type olefin range between 95:5 and 70:30 by weight (the ratio given hereafter will always be by weight unless otherwise indicated), is sulfonated with use of an inert gas mixture of $SO_3$.

α-olefin, which is manufactured commercially by means of the polymerization of ethylene in the presence of Ziegler catalyst, usually contains vinylidene type olefin, but the content of said vinylidene type olefin is at most several percent, and in this case it is not possible to maintain the formation of disulfonates in olefin sulfonate at a low limit.

According to this invention it is preferable that an olefin which mainly consists of α-olefin should have 10–20 carbon atoms, or more preferably 12–18 carbon atoms, which contains more than 85 parts by weight of α-olefin, and which is manufactured commercially by means of wax-cracking or polymerization of ethylene in the presence of Ziegler catalyst.

An olefin mainly consisting vinylidene type olefin which can be used according to the invention should contain more than 70 parts by weight of vinylidene type olefin which may be expressed by the general formula of

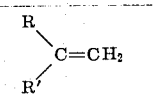

(where R and R' stand for alkyl radicals), and its number of carbon atoms ranges between 10 and 20, or more preferably ranges from 12 to 18. It is dimeric substance of olefin (or dimer olefin) being prepared by means of dimerization of an olefin which has 5 to 10 carbon atoms, or more preferably 6 to 9 carbon atoms, or by means of other methods. Similar to α-olefin, an olefin of this type can by itself be made into a material for detergents by means of sulfonation with the use of an inert gas mixture of $SO_3$. The content ratio of α-olefin to vinylidene type olefin in an olefin mixture should usually be in the range of 95:5–70:30, or more preferably in the range of 90:10–70:30. The reason why the content ratio should thus be defined is that, as may be seen from the examples given hereinafter, if the content of the vinylidene type olefin is less than 5 percent of the whole olefin starting mixture, the content of disulfonate contained in the whole sulfonate product would not be less than 8 percent, and if the vinylidene olefin content is less than 10 percent, the content of disulfonate in the product would not be less than 5 percent.

On the other hand, even in case of increasing the content of vinylidene type olefin to more than 30 percent, the results are that not only much less formation of disulfonate is unexpected but also the sulfonate thus obtained will damage the free flowing property of the prepared granular detergents after having been mixed with builders. α-olefin and vinylidene type olefin are mixed at the ratio mentioned in the foregoing to prepare an olefin mixture and these two types of olefins are then sulfonated simultaneously with the use of an inert mixed gas of $SO_3$.

According to the invention, the sulfonation is conducted with the use of a gas which is prepared by diluting $SO_3$ with nitrogen or air to 2–10 percent by volume, or more preferably to 3–6 percent by volume, employing 1.0–1.2, or more preferably 1.05–1.15 mole of $SO_3$ per mole of a mixture of olefin, at the temperature ranging from 20° to 120°C, (or more) preferably from 40° to 100°C.. As for the sulfonator, it is desirable to use a continuous falling film sulfonator.

The sulfonated product thus obtained is neutralized with the use of basic substances, particularly with an aqueous solution of caustic alkali, using temperatures ranging from room temperature to 70°C. and then raising the temperature of the neutralized solution to conduct hydrolysis under the conditions ranging from 100°/7 hours to 200°/5 minutes to obtain olefin sulfonates.

According to the abovementioned method it is now possible to reduce the formation of disulfonates in the olefin sulfonates to a low limit as compared with the case where olefin sulfonates are prepared by sulfonating α-olefin alone.

The achievement of these results must most probably be deemed to be due to the fact that, owing to a competitive reaction which takes place between the α-olefin and the vinylidene type olefin in the course of simultaneous sulfonation reaction occurring between the α-olefin and the vinylidene type olefin, vinylidene type olefin starts to react selectively earlier than α-olefin in its early stage of reaction and the resultant vinylidene olefin sulfonic acid acts as a buffer agent in the fierce reaction which takes place between α-olefin and $SO_3$.

By means of such effects, the rate of the sulfonating reaction of α-olefin can be maintained until its completion and it has also been made possible to obtain sulfonated products in which the content of disulfonate is small due to the mild reaction in the early stage of the sulfonating reaction. And it is also noticed that the optimum reaction temperature required for the simultaneous sulfonation of both α-olefin and vinylidene type olefin is lower than that required for the sulfonation of α-olefin alone by several degrees centigrade and it can readily be imagined that the low reaction temperature has a favorable influence upon the desired low formation of disulfonates.

According to the present invention, it has been made possible to keep down the formation of disulfonate in olefin sulfonate at an extremely low level and also to maintain the reaction temperature lower and to decrease the consumption of $SO_3$ as compared with the case where α-olefin alone is sulfonated. Detergents made from olefin sulfonates thus prepared have excellent foaming effect and detergency and they are not only excellent in their preservability when prepared in the form of granules but also show excellent properties when made into liquid detergents or when used in other types of detergents.

The invention will be further described with reference to the following experimental test and examples; however, this invention is not intended to be limited by the details set forth in these experimental test and examples.

EXPERIMENTAL TEST

Olefin mixtures were prepared with α-olefin and vinylidene type olefin mixed at various ratios as set forth below, both being free from impurities, and the mixtures were sulfonated by the use of a continuous thin film sulfonation unit designed on a laboratory scale as mentioned below. The reaction unit is made of Pyrex glass having an inside diameter of 5 mm and equipped with a reaction zone having a length of 120 cm, in which an olefin mixture and SO₃ are made to flow downwardly continuously in parallel to come in contact with each other. Reaction conditions are: the concentration of SO₃ = 2.8 vol. percent (diluted with nitrogen gas), the contact time = 30 seconds, the rate of olefin feeding = 6 ml/min., the temperature of olefin mixture = 30°C.

Incidentally, the mole ratios of SO₃/olefin and the reaction temperatures used in the experimental tests are as per conditions indicated in the following table.

The various sorts of sulfonates thus prepared were neutralized respectively with use of a 10% NaOH aqueous solution so the respective solution would become equimolar with SO₃ which had been introduced at the time of sulfonation, and then were hydrolyzed at 160°C. for 20 minutes to obtain olefin sulfonic acid-Na. Property analyses were made of olefin sulfonic acid-Na thus obtained after it had gone through process of dealkalization and removal of oils not reacted and Glauber's salt, whose results are shown in Table 2.

TABLE 2

Sulfonating Reaction Conditions and Analytical Properties of Sulfonated Products Prepared from Olefin Mixtures Having Various Mixing Ratios of α-Olefin to Vinylidene Olefin

| Component of Mixture (wt %) | | SO₃/Olefin* mole ratio | Reaction Temperature* (°C) | Conversion Ratio (%) | Disulfonate in the Sulfonate (wt %) |
|---|---|---|---|---|---|
| AO | VO | | | | |
| 100 | 0 | 1.20 | 50 | 96.2 | 16 |
| 100 | 0 | 1.15 | 50 | 92.0 | 12 |
| 95 | 5 | 1.15 | 45 | 96.0 | 8 |
| 90 | 10 | 1.15 | 44 | 96.3 | 5 |
| 80 | 20 | 1.14 | 43 | 96.2 | 5 |
| 70 | 30 | 1.13 | 42 | 96.5 | 4 |
| 60 | 40 | 1.12 | 41 | 96.7 | 4 |
| 50 | 50 | 1.12 | 40 | 97.0 | 4 |

Notes: AO and VO stand for α-olefin and vinylidene type olefin respectively.
*SO₃/olefin mole ratio and the reaction temperature required for obtaining the maximum reaction percentage and color tone of sulfonate.

It can be noticed from Table 2 that:

1. In case where α-olefin alone is used as a material, the reaction percentage decreases remarkably when an attempt is made to decrease the quantity of disulfonate.

2. The formation of disulfonate can be kept down below 8 percent without decreasing the reaction percentage when more than 5 percent of vinylidene type olefin is contained in the olefin mixture; however, the formation of disulfonate no longer decrease when more than 30 percent of vinylidene type olefin is present.

EXAMPLE 1

α-olefin having 15–18 carbon atoms (purity 90 percent, containing no vinylidene type olefin) manufactured commercially by means of wax-cracking of paraffin was admixed with dimer olefin having 12–16 carbon atoms (containing 90 percent vinylidene type olefin and no α-olefin) obtained from short chain olefin having mainly six to eight carbon atoms by dimerization to make a mixture having a 85-to-15 ratio of α-olefin to vinylidene type olefin. Sulfonation was conducted in such a way as to bring the olefin mixture into contact with SO₃ which had been diluted to 5 percent with use of air by letting the former flow down in the form of thin film through a vertical standing pipe and the latter pass through the pipe flowing in the same direction. The mole ratio of olefins to SO₃ was 1:1.15 at that time. The sulfonated product thus obtained was immediately (within 5 minutes) neutralized with use of caustic soda solution equimolar to SO₃ existing in the product at the temperature ranging from 50°C to 60°C. The temperature of the mixture was raised to 160°C. which was maintained for 20 minutes and the mixture was then cooled to 50°C. or below. Disulfonate contained in olefin sulfonate thus obtained was 8%.

EXAMPLE 2

α-olefin having 12–16 carbon atoms (containing 3.2 percent vinylidene type olefin) manufactured commercially by polymerizing ethylene in the presence of Ziegler catalyst was admixed with the same dimer olefin as used in Example 1 in such a way as to make the ratio of α-olefin to vinylidene type olefin 75:25. The olefin mixture was then made to flow in the thickness of 0.02 mm at the rate of 5.58 kg/min. down on the wall of the cylinder of a sulfonating apparatus (here the cylinder is made to allow water run through), which is designed to let the olefin mixture fall down in a predetermined thickness by overflowing from the top of the cylinder. At the same time, an SO₃(gas) was made to flow at the rate of 2.44 kg/min in gaseous phase following the direction of the olefin mixture. The gaseous SO₃ gas used in this case was diluted to 3 percent by volume with use of the air. The flow rate of the gas within the cylinder was 24 m/sec. During this process, the reaction heat was made to be absorbed by the quenching water to keep the reaction temperature between 45° and 47°C., and the gauge reading of the pressure was maintained at 0.8 kg/cm³. The time of contact established between the gas and the solution was 6 minutes. The sulfonated products were then put into a tank equipped with a mixer and was stirred at 30°C. for 15 minutes. To the reaction products thus obtained at 13% solution of caustic soda was added at the rate of 6.57kg/min (using 0.7 mole per 1 mole of SO₃) and was heated at 160°C. for 10 minutes by the use of an autoclave and then cooled. The amount of disulfonate contained in olefin sulfonate thus obtained was 4.3 percent.

What we claim is:

1. In a method for preparing a mixture of α-olefin monosulfonates and dimer olefin monosulfonates, said mixture containing less than about 8 percent by weight of by-produced disulfonates, comprising the steps of sulfonating a starting olefin mixture with SO₃ gas diluted with inert gas, and then hydrolyzing and neutralizing the sulfonated olefin mixture, the improvement which comprises, effecting the sulfonation step by reacting at a temperature in the range of from 20° to 120°C, A. a starting olefin mixture consisting essentially of (1) α-olefin having 10 to 20 carbon atoms and (2) vinylidene olefin of the formula

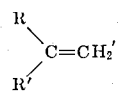

wherein R and R' are alkyl radicals and the total number of carbon atoms in the vinylidene olefin is in the range of from 10 to 20, the weight ratio of (1) to (2) in said starting olefin mixture being in the range of 95:5 to 70:30, with B. 1.0 to 1.2 mols of $SO_3$ gas per mol of starting $\alpha$-olefin mixture, said $SO_3$ gas being diluted with an inert gas to an $SO_3$ concentration of from 2 to 10 percent by volume.

2. A method according to claim 1 wherein said ratio of $\alpha$-olefin to vinylidene type olefin in the olefin mixture ranges from 90:10 to 70:30 by weight.

3. A method according to claim 1, wherein sulfonation is conducted maintaining the mole ratio of olefin mixture to $SO_3$ gas at 1.05–1.15.

4. A method according to claim 1, wherein sulfonation is conducted at a temperature ranging from 40°C to 60°C.

5. A method according to claim 1, wherein sulfonation is conducted using an inert gas mixture of $SO_3$ which is prepared by diluting $SO_3$ to 3–6 percent by volume with use of an inert gas.

6. A method according to claim 1, wherein sulfonation is conducted by the use of a continuous falling film sulfonator.

* * * * *